United States Patent [19]

Brulet et al.

[11] 4,222,882

[45] Sep. 16, 1980

[54] POLYMERS BEARING GROUPS DERIVED FROM N-SUBSTITUTED LACTAMS AND THEIR USE AS LUBRICATING OIL ADDITIVES

[75] Inventors: Daniel Brulet, Claye Souilly; Robert Pocheville, Paris; Bernard Chauvel, Ermont, all of France

[73] Assignees: Rhone-Poulenc Industries, Paris; l'Institut Francais du Petrole, Rueil Malmaison, both of France

[21] Appl. No.: 7,032

[22] Filed: Jan. 26, 1979

[30] Foreign Application Priority Data

Feb. 8, 1978 [FR] France .............................. 78 03460
Feb. 8, 1978 [FR] France .............................. 78 03461

[51] Int. Cl.² ............................................. C10M 1/32
[52] U.S. Cl. .............................. 252/51.5 A; 525/178; 525/192; 525/205; 525/293; 525/375; 525/421
[58] Field of Search .............. 252/51.5 A; 260/857 D, 260/857 G, 879, 880; 526/20, 21, 50

[56] References Cited

U.S. PATENT DOCUMENTS

| | | | |
|---|---|---|---|
| 3,364,181 | 1/1968 | Elder et al. ............................ | 526/21 |
| 3,423,367 | 1/1969 | Merijan et al. ...................... | 252/50 X |
| 3,481,923 | 12/1969 | Naarmann ................... | 260/857 D X |
| 3,886,127 | 5/1975 | Furukawa et al. ..................... | 526/20 |
| 3,887,643 | 6/1975 | Selman ............................. | 260/857 D |
| 4,070,344 | 1/1978 | Hergenrother et al. .......... | 526/21 X |
| 4,085,055 | 4/1978 | Durand et al. .......................... | 252/50 |
| 4,145,298 | 3/1979 | Trepka ............................... | 252/50 X |
| 4,146,489 | 3/1979 | Stambaugh ................. | 252/51.5 A X |

*Primary Examiner*—Andrew Metz

[57] ABSTRACT

Novel lubricating oil polymer additives are obtained by the following:
 (1) by preparing, by anionic polymerization, a living diene polymer of $\overline{Mn}$ of between about 20,000 and 300,000;
 (2) by functionalizing the said polymer by means of an N-substituted lactam of the type of N-alkylcaprolactam, N-binylcaprolactam, and particularly of the type of N-alkylpyrrolidione and N-vinylpyrrolidone; and
 (3) by hydrogenating the said functionalized polymer.

A variant method of preparing the said polymers comprises subjecting the living polymer to a metalation operation before functionalization; the hydrogenation operation is carried out before metalation or after functionalization.

The said polymers may be used as additives which improve the viscosity index and the dispersing power of lubricating oils. The amount of additive added is between about 0.1 and 10 percent by weight.

32 Claims, No Drawings

POLYMERS BEARING GROUPS DERIVED FROM N-SUBSTITUTED LACTAMS AND THEIR USE AS LUBRICATING OIL ADDITIVES

BACKGROUND OF THE INVENTION

The present invention is directed to polymers bearing groups derived from N-substituted lactams and their use as additives for improving the viscosity index and the dispersing power of lubricating oils.

From U.S. Pat. No. 3,137,222, it is known to use copolymers of methacrylates and N-vinylpyrrolidone to increase the viscosity index and the dispersing power of lubricating oils.

These copolymers are prepared by radical polymerization and, therefore, have a broad molecular distribution, making them sensitive to shear and of little effect on the thickening power or viscosity index of an oil.

By the present invention, new polymers are provided which can be used as additives to improve the viscosity index and the dispersing power of lubricating oils.

It is, therefore, an object of the present invention to provide novel polymeric additives for lubricating oils which impart excellent dispersing properties and improve the viscosity index of lubricating oils.

It is also an object of the invention to provide a novel process for producing the novel additives of the invention.

It is a further object of the invention to provide novel lubricating oils containing the novel additives of the invention.

Other objects of the invention will be apparent to those skilled in the art from the present description.

General Description of the Invention

The polymers of the novel additives of the present invention are obtained by subjecting a living polymer of number average molecular weight $\overline{Mn}$ of between about 20,000 and 300,000, and preferably between about 30,000 and 150,000, prepared by anionic polymerization of at least one $C_4$-$C_6$ conjugated diene and possibly at least one compound selected from among vinyl aromatic compounds, to a functionalization operation by reaction with an N-substituted lactam of the formula:

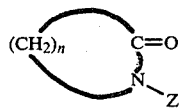

in which Z represents a $C_1$-$C_{20}$, and preferably $C_1$-$C_{10}$, alkyl radical, a $C_2$-$C_{10}$, and preferably a $C_2$-$C_4$ alkenyl radical, a phenyl radical possibly substituted by a $C_1$-$C_{10}$, and preferably $C_1$-$C_5$, alkyl group, "n" representing a whole number of from about 2 to 11, and preferably from about 3 to 5, and particularly equal to 3; and to hydrogenation.

A variant method of preparing the said polymers comprises subjecting the said living polymer to a metalation operation before functionalization by the said N-substituted lactam and in carrying out the hydrogenation operation prior to the metalation operation or subsequent to the functionalization operation.

In accordance with this variant, it is preferable to effect the hydrogenation operation prior to the metalation and functionalization operations in order to obtain polymers of better polydispersity index.

Among the living polymers which may be employed, mention may be made of:

(1) those obtained by anionic polymerization of at least one diene, such as butadiene, isoprene, or dimethyl butadiene, (2) the random or block copolymers obtained by anionic polymerization of at least one of the above-mentioned dienes and of a vinyl aromatic compound, such as styrene and α-methylstyrene, (3) the "star" copolymers obtained from at least one of the above-mentioned dienes, possibly mixed with a vinyl aromatic compound of the styrene or α-methylstyrene type and divinylbenzene.

The said living polymers can be prepared at a temperature of between about minus 80° and plus 150° C., and preferably between about 0° and 100° C., in the presence of hydrocarbon solvents, such as cyclohexane, hexane, heptane, dodecane, benzene, toluene, xylene, etc., the lubricating oil additive support oils and/or polar solvents, such as ethers of the type of dioxan or tetrahydrofuran, the methylethers of diethylene or triethylene glycol, the amines of the tetramethylene diamine type, and the phosphoramides of the hexamethylphosphoramide type. Mixtures of solvents which may contain up to 15 percent polar solvent will preferably be employed.

The catalysts which may be used to carry out the anionic polymerization operation are organometallic catalysts well known to the man skilled in the art, preferably organolithium catalysts such as n-butyllithium, sec-butyllithium, phenyllithium, 1,4-dilithiobutane, 1,4-dilithio-1,1,4,4-tetraphenylbutane, naphthalene lithium, or organo-sodium naphthalenes, such as naphthalene sodium.

The amount of catalyst to be used is such that the ratio of the rate of monomer(s) to amount of catalyst in mols is equal to the number average molecular weight $\overline{Mn}$ of the polymer to be obtained.

The so-called "star" polymers can be prepared by the method of operation described in Belgian Pat. No. 850,336, excluding the polymerization step.

As is known to the man skilled in the art, the living polymers obtained by anionic polymerization in the presence of an organometallic compound have a metal atom disposed at one end of said polymer when the organometallic compound used is monofunctional and a metal atom arranged at each end of said polymer when the organometallic compound used is bifunctional.

The metalation operation, optionally employed, can be carried out in accordance with the known metalation techniques, for instance, treatment of the polymer with a complex consisting of a diamine and an organic compound of an alkali metal (French patent published under U.S. Pat. No. 2,047,980). For the satisfactory conduct of this operation, it is effected with the use of a complex consisting of N,N,N'N'-tetramethyleneethylene diamine and a butyllithium, in particular sec-butyllithium, with a molar ratio of diamine to butyllithium of between about 0.5 and 1.2, and preferably between about 0.7 and 1.

This operation is carried out at a temperature of between about −80° and +100° C., and preferably between about 0° and 80° C., for generally 1 to 24 hours, in the presence of an inert solvent of the type cited above as polymerization solvent, and more particularly hydrocarbon solvents.

The amount of metalation complex employed is such that the number of mols of organometallic compound of said complex per mol of polymer is less than about 50 and preferably between about 2 and 10.

The metalated polymer obtained has a carbanion site at the end of the chain, as well as one or more carbanion sites along the chain.

Among the lactams which can be used for carrying out the functionalization operation, mention may be made of N-methylcaprolactam, N-ethylcaprolactam, N-vinylcaprolactam, and very particularly, N-methylpyrrolidone, N-ethylpyrrolidone, and N-vinylpyrrolidone.

The said operation is desirably carried out at a temperature of between about 10° and 80° C., and preferably between about 30° and 60° C. This operation is rapid; it generally takes less than an hour.

The amount of lactam to be used is such that the molar ratio of N-substituted lactam to organometallic compound(s) used for the polymerization and, if applicable, the metalation (that is to say, the ratio of mols of N-substituted lactam to number of carbanion sites) is at least 1.

When the living polymer has not undergone a metalation operation, this ratio is preferably from about 1 to 3; when the living polymer has undergone a metalation operation, this ratio is preferably from about 1 to 2.

The functionalized polymers obtained can possibly be deactivated by addition of a deactivating agent, such as water, alcohols of the type of methanol, ethanol, isopropanol, etc., and $C_1$-$C_5$ aliphatic carboxylic acids. This operation takes place instantaneously in the cold by means of a stoichiometric amount of deactivating agent referred to the quantity of organometallic compound(s) employed.

The hydrogenation step is preferably carried out in the presence of catalytic systems obtained by reaction of derivatives of transition metals, such as nickel or cobalt carboxylates or acetylacetonates, with organo-reducing compounds, such as organoaluminum compounds, organolithiums or their hydrides, the hydrides of lithium or aluminum, and the mixed hydrides of lithium and aluminum. Conventional hydrogenation techniques employing catalysts having a base of Raney nickel or platinum or palladium deposited on carbon can also be employed.

The solvents which can be used to effect the hydrogenation step are the same as those used to carry out the anionic polymerization step.

In order to have good stability to thermal oxidation, at least 85 percent, and preferably at least 95 percent, of the olefin, double bonds must be hydrogenated.

The hydrogenation catalyst can be eliminated by filtration, centrifuging, or treatment by an absorbent earth.

An important object of the invention is polymers obtained by a variant of the method of operation described above, which variant consists in effecting a grafting operation after the metalation operation and prior to the functionalization operation. The said operation is carried out by adding to the medium a $C_4$-$C_6$ conjugated diene and/or a vinyl aromatic monomer, such as styrene or α-methylstyrene.

The grafting operation is effected at a temperature of between −80° and +150° C., and preferably between 0° and 100° C., generally for 1 to 3 hours, and more particularly for 1 or 2 hours.

The amount of grafting monomer to be used is such that the weight of grafts corresponds to about 1 to 30 percent, and preferably about 1 to 10 percent of the weight of grafted polymer.

Another important object of the present invention is the use of the new polymers having groups derived from N-substituted lactams as additives which make it possible to improve the viscosity index and the dispersing power of lubricating oils.

The oils which can be used are oils of naphthene base, paraffin base, or mixed base. They can be derived from coal or synthetic products such as alkylene polymers, polymers of the alkylene oxide type prepared by polymerizing alkylene oxide in the presence of water or alcohols. The alkylbenzenes, dialkylbenzenes, polyphenyls, alkylbiphenylethers and polymers of silicon can also be employed.

The amount of additive to be added is between about 0.1 and 10 percent of the weight of lubricating oil, and preferably between about 1 and 5 percent.

One can also use additional additives to obtain the required stability, an additional detergency and dispersing power, and the anti-wear and anti-corrosion properties required in modern lubricating compositions.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1—Comparative Test 1180 g. of cyclohexane which has been dried over a molecular sieve and degasified with argon are introduced into a reactor, followed by 0.95 g. of dimethylether of dioxyethylene glycol. 146 g. of butadiene and $3 \times 10^{-3}$ mols of butyllithium are then added. Polymerization is allowed to take place for 3 hours at 60° C. under argon and $2.310^{-3}$ mols of isopropanol are added.

1050 g. of the above solution are then taken and 180 mg. are added thereto of a catalyst having a base of triethylaluminum and cobalt octoate (3.6 percent Co and 6.3 percent Al). A pressure of 50 bars is maintained for 2 hours at 100° C. After verification of the olefin unsaturation by NMR, the solution is treated with 2 g. of Clarsil MO2 (registered trademark) an adsorbent earth comprising an aluminum silicate containing about 70.5 percent silica and about 15 percent aluminum oxide, at 80° C. for 2 hours and then filtered so as to retain less than 10 ppm. of cobalt.

The solution is then mixed with 200 Neutral lubricating oil so as to obtain, after evaporation of the cyclohexane under vacuum at 120° C., a 2 percent solution by weight of polybutadiene.

The following properties are then determined:

the thickening power. It is expressed by the concentration of polymer necessary to obtain a viscosity of 14 cst (centistokes) at 100° C., in 200 Neutral oil.

the VIE (Viscosity Index Extended), in accordance with ASTM Standard 2270.

the dispersing power, in accordance with the method described by V. A. Gates, et al., in SAE preprint No. 572 (1955) or by A. Schilling in "Les Huiles Pour Moteurs et le Graissage des Moteurs," ("Motor Oils and the Lubrication of Engines"), published by Technip, Volume 1, page 89 (1962).

The method is carried out using an SAE 30 oil containing 2 percent of product prepared above and 1 percent sludge.

The mixture of treated oil and sludge is separated into six fractions which are agitated and subjected to one of the following six heat treatments:

one fraction subjected to 50° C. for 10 minutes
one fraction subjected to 50° C. for 10 minutes in the presence of 1 percent water
one fraction subjected to 200° C. for 10 minutes
one fraction subjected to 200° C. for 10 minutes in the presence of 1 percent water
one fraction subjected to 250° C. for 10 minutes
one fraction subjected to 280° C. for 10 minutes.

One drop of each mixture obtained after heat treatment is deposited on a filter paper. Rating is effected at the end of 24 hours; for each spot there is calculated the percentage of dispersed product referred to the drop of oil by forming the ratio of the respective diameters of the drop of oil and the dispersed product. The higher the percentage of dispersed product, the better the dispersion with respect to the sludge.

The properties of the product are set forth in Table I, below.

EXAMPLE 2

A polymerization operation is carried out as in Example 1, starting with:

146 g. of butadiene, and
$3 \times 10^{-3}$ mols of n-butyllithium.

The operation takes place for 3 hours at 60° C., whereupon $3 \times 10^{-3}$ mols of N-methylpyrrolidone are added (which represents a molar ratio of N-methylpyrrolidone to n-butyllithium of 1 or a molar ratio of N-methylpyrrolidone to polymer of 1). The functionalization operation is carried out for 45 minutes at 60° C.

The medium is then deactivated by addition of $2.3 \times 10^{-3}$ mols of isopropanol at room temperature.

1050 g. of resultant solution are taken and a hydrogenation operation is carried out as in the preceding example using 360 mg. of hydrogenation catalyst.

The polymer obtained is formed of chains containing a single recurrent unit derived from the N-methylpyrrolidone at the chain end.

EXAMPLE 3

This example is carried out under conditions similar to those of Example 2, but replacing the N-methylpyrrolidone by the same amount of N-vinylpyrrolidone.

EXAMPLE 4

This example is carried out under conditions similar to those of Example 3, using $9 \times 10^{-3}$ mols of N-vinylpyrrolidone, which corresponds to a molar ratio of N-vinylpyrrolidone to n-butyllithium of 3, or a ratio of N-vinylpyrrolidone to polymer of 3.

The polymer is formed of chains containing a single recurrent unit derived from the N-vinylpyrrolidone at the chain end.

EXAMPLE 5

This example is carried out under conditions similar to those of Example 3, using 146 g. of a mixture of butadiene and styrene in a weight ratio of 50:50.

EXAMPLE 6

This example is carried out under conditions similar to those described in Example 3, using 146 g. of a mixture of butadiene and styrene in a weight ratio of 70:30.

EXAMPLE 7

This example is carried out under conditions similar to those of Example 6, using:
146 g. of a 70:30 mixture of butadiene and styrene
$1.5 \times 10^{-3}$ mols of n-butyllithium
$1.5 \times 10^{-3}$ mols of N-vinylpyrrolidone.

EXAMPLE 8

This example is carried out under conditions similar to those of Example 3, using 146 g. of a 70:30 by weight mixture of isoprene and styrene and effecting the functionalization operation for 55 minutes at 30° C., instead of 45 minutes at 60° C.

EXAMPLE 9

This example is carried out under conditions similar to those of Example 2, using:
146 g. of butadiene
$3 \times 10^{-3}$ mols of 1,1-dilithio-1,1,4,4-tetraphenylbutane
$6 \times 10^{-3}$ mols of N-methylpyrrolidone which represents a molar ratio of N-methylpyrrolidone to organolithium of 2, or a molar ratio of N-methylpyrrolidone to polymer of 2.

The polymer obtained is formed of chains containing two recurrent units derived from N-methylpyrrolidone, namely, one unit at each chain end.

EXAMPLE 10

A polymerization operation is carried out as in Example 1 with:
146 g. of butadiene, and
$3 \times 10^{-3}$ mols of n-butyllithium.

The operation is carried out for 3 hours at 60° C. The medium is cooled to 20° C., and $15 \times 10^{-3}$ mols of sec-butyllithium and $15 \times 10^{-3}$ mols of N,N,N',N'-tetramethylene ethylene diamine (TMEDA) are added.

The metalation operation is carried out for 2 hours at 50° C., with agitation.

$18 \times 10^{-3}$ mols of N-methylpyrrolidone are then added, this representing a molar ratio of N-methylpyrrolidone to organometallic compound (n-butyllithium+sec-butyllithium) of 1. The functionalization operation is carried out for 45 minutes at 60° C.

1050 g. of the resultant solution are taken and a hydrogenation operation is carried out, as in Example 1, using 720 mg. of catalyst.

The polymer obtained contains several nitrogen units per chain, with one unit at one end.

EXAMPLE 11

A polymerization operation is carried out as in Example 10 with:
146 g. of butadiene and
$3 \times 10^{-3}$ mols of n-butyllithium for 3 hours at 60° C., followed by a metalation operation using $15 \times 10^{-3}$ mols of sec-butyllithium and $15 \times 10^{-3}$ mols of TMEDA, for 2 hours at 50° C., with agitation.

$30 \times 10^{-3}$ mols of styrene are then added to effect a grafting operation. The latter is effected at 60° C. for 2 hours.

$18\times10^{-3}$ mols of N-methylpyrrolidone are then added; the functionalization operation is carried out for 55 minutes at 30° C.

1050 g. of the resultant solution are taken and a hydrogenation operation carried out as in Example 2.

The grafted polymer obtained contains several recurrent nitrogen units per chain, with one unit at one end.

EXAMPLE 12

A polybutadiene sequence is effected as in Example 1, starting from:

146 g. of butadiene and $3\times10^{-3}$ mols of n-butyllithium for 3 hours at 60° C. $3\times10^{-3}$ mols of styrene are then added and the polymerization operation is continued for 2 hours at 60° C. in order to produce a very short styrene sequence.

A hydrogenation operation is carried out in accordance with the manner of operation described in Example 1. The reaction mixture is filtered over adsorbent earth and dried over a molecular sieve.

$15\times10^{-3}$ mols of sec-butyllithium and $15\times10^{-3}$ mols of TMEDA are added and a metalation operation is carried out in the manner described in Example 10. Then $15\times10^{-3}$ mols of N-methylpyrrolidone are added and heating is effected at 60° C. for 45 minutes.

The copolymer obtained contains several nitrogen units per chain, with one unit at one end.

EXAMPLE 13

The conditions of Example 12 are repeated, the hydrogenation operation being carried out after the functionalization operation.

EXAMPLE 14

This example is carried out under conditions similar to those of Example 12 with $15\times10^{-3}$ mols of N-vinylpyrrolidone instead of N-methylpyrrolidone.

EXAMPLE 15

This example is carried out under conditions similar to those of Example 10, with:

146 g. of butadiene
$1.5\times10^{-3}$ mols of n-butyllithium
$16.5\times10^{-3}$ mols of N-vinylpyrrolidone.

EXAMPLE 16

This example is carried out under conditions similar to those of Example 12, with:

146 g. of butadiene
$3\times10^{-3}$ mols of n-butyllithium
$24\times10^{-3}$ mols of sec-butyllithium
$24\times10^{-3}$ mols of TMEDA
$27\times10^{-3}$ mols of N-methylpyrrolidone The properties of the polymers prepared in Examples 2 to 16 are set forth in Tables I to IV, inclusive, below:

TABLE I

| EXAMPLES | 1 | 2 | 3 | 4 | 5 |
|---|---|---|---|---|---|
| Monomers | Bu | Bu | Bu | Bu | Bu/Iso |
| Organolithium | Buli | Buli | Buli | Buli | Buli |
| Lactam | — | NMP | NVP | NVP | NVP |
| Lactam/polymer molar | 0 | 1 | 1 | 3 | 1 |
| $\overline{Mn}$ | 51,300 | 49,000 | 53,900 | 50,500 | 65,000 |
| $\overline{Mw}$ | 67,200 | 65,900 | 80,800 | 74,500 | 90,000 |
| % hydrogenation | 98 | 97 | 98 | 99 | 99 |
| dispersive power | | | | | |
| 50° C. | 44 | 88 | 93 | 93 | 88 |
| 50° C. + H$_2$O | 43 | 92 | 93 | 93 | 90 |
| 200° C. | 36 | 90 | 91 | 91 | 65 |
| 200° C. + H$_2$O | 39 | 84 | 84 | 89 | 79 |
| 250° | 36 | 83 | 82 | 82 | 62 |
| 280° | 35 | 78 | 79 | 91 | 62 |
| Σ | 233 | 515 | 522 | 529 | 446 |
| VIE | 140 | 135 | 138 | 134 | 136 |
| thickening power | 2.2 | 2 | 1.8 | 1.9 | 1.8 |

In All Tables:
Bu: butadiene
Buli: butyllithium
$\overline{Mn}$: number average molecular weight of the polymer
$\overline{Mw}$: weight average molecular weight of the polymer
NMP: N-methylpyrrolidone
NVP: N-vinylpyrrolidone
dili: 1,1-dilithio-1,1,4,4-tetraphenylbutane
Iso: isoprene
Sty: styrene

TABLE II

| EXAMPLES | 6 | 7 | 8 | 9 |
|---|---|---|---|---|
| Monomers | Bu/Sty | Bu/Sty | Iso/Sty | Bu |
| Organolithium | Buli | Buli | Buli | dili |
| Lactam | NVP | NVP | NVP | NMP |
| Lactam/polymer molar | 1 | 1 | 1 | 1 |
| $\overline{Mn}$ | 56,000 | 112,000 | 84,000 | 78,800 |
| $\overline{Mw}$ | 65,000 | 130,000 | 120,000 | 140,000 |
| % hydrogenation | 98 | 99 | 98 | 98 |
| dipersive power | | | | |
| 50° C. | 90 | 84 | 89 | 92 |
| 50° C. + H$_2$O | 89 | 86 | 92 | 91 |
| 200° C. | 85 | 82 | 90 | 58 |
| 200° C. + H$_2$O | 89 | 83 | 86 | 85 |
| 250° C. | 83 | 80 | 85 | 49 |
| 280° C. | 80 | 78 | 79 | 49 |
| Σ | 516 | 493 | 521 | 424 |
| VIE | 138 | 142 | 132 | 139 |
| thickening power | 2.1 | 1.6 | 1.7 | 1.7 |

TABLE III

| EXAMPLES | 10 | 11 | 12 |
|---|---|---|---|
| Monomers | Bu | Bu/Sty | Bu/Sty |
| Lactam | NMP | NMP | NMP |
| Lactam/organo-lithium (molar) | 1 | 1 | 1 |
| $\overline{Mn}$ | 54,000 | 33,500 | 49,500 |
| $\overline{Mw}$ | 76,000 | 70,000 | 71,000 |
| % hydrogenation | 99 | 98 | 100 |
| dispersive power | | | |
| 50° C. | 82 | 82 | 95 |
| 50° C. + H$_2$O | 87 | 85 | 95 |
| 200° C. | 73 | 82 | 91 |
| 200° C. + H$_2$O | 75 | 87 | 86 |
| 250° C. | 70 | 86 | 93 |
| 280° C. | 65 | 85 | 80 |
| Σ | 452 | 507 | 530 |
| VIE | 131 | 128 | 132 |
| thickening power | 1.9 | 2.1 | 2 |

TABLE IV

| EXAMPLES | 13 | 14 | 15 | 16 |
|---|---|---|---|---|
| Monomers | Bu/Sty | Bu/Sty | Bu | Bu |

TABLE IV-continued

| EXAMPLES | 13 | 14 | 15 | 16 |
|---|---|---|---|---|
| Lactam | NMP | NVP | NVP | NMP |
| Lactam/organo-lithium (molar) | 1 | 1 | 1 | 1 |
| $\overline{Mn}$ | 47,500 | 52,600 | 110,000 | 53,250 |
| $\overline{Mw}$ | 73,000 | 74,650 | 178,200 | 79,250 |
| % hydrogenation | 100 | 98.5 | 98 | 97 |
| dispersive power | | | | |
| 50° C. | 84 | 89 | 90 | 93 |
| 50° C. + H$_2$O | 88 | 91 | 91 | 93 |
| 200° C. | 72 | 88 | 88 | 90 |
| 200° C. + H$_2$O | 68 | 90 | 89 | 90 |
| 250° C. | 63 | 87 | 87 | 93 |
| 280° C. | 63 | 83 | 82 | 85 |
| Σ | 438 | 528 | 527 | 544 |
| VIE | 131 | 138 | 135 | 133 |
| thickening power | 2 | 1.9 | 1.5 | 1.8 |

As can be seen from the foregoing Tables, the additives of the invention impart excellent properties to lubricating oils.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A lubricating oil polymer additive produced in accordance with the process which comprises:
   subjecting a living polymer of number average molecular weight ($\overline{Mn}$) of between about 20,000 and 300,000, said living polymer being prepared by anionic polymerization of at least one C$_4$-C$_6$ conjugated diene or a copolymer of a C$_4$-C$_6$ conjugated diene with a vinyl aromatic compound to a functionalization operation by reaction with an N-substituted lactam of the formula:

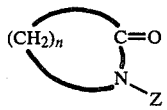

(I)

in which Z represents a member selected from a C$_1$-C$_{20}$ alkyl radical, a C$_2$-C$_{10}$ alkenyl radical, a phenyl radical, and n represents a whole number from about 2 to 11; and to a hydrogenation.

2. A lubricating oil polymer additive according to claim 1, wherein the anionic polymerization includes at least one C$_4$-C$_6$ conjugated diene and at least one compound selected from among vinyl aromatic compounds.

3. A lubricating oil polymer additive according to claim 1, wherein the phenyl radical is also substituted by a C$_1$-C$_{10}$ alkyl group.

4. A lubricating oil polymer additive according to claim 1, wherein the functionalization operation is preceded by an operation of metalation of the said living polymer.

5. A lubricating oil polymer additive according to claim 4, wherein the hydrogenation operation is carried out before the metalation operation.

6. A lubricating oil polymer additive according to any of claims 1 to 3, wherein the said living polymer has a number average molecular weight $\overline{Mn}$ of between 30,000 and 150,000.

7. A lubricating oil polymer additive according to any of claims 1 to 4, wherein the living polymer employed is a random or block polymer or copolymer of at least one diene selected from among butadiene, isoprene, and dimethylbutadiene.

8. A lubricating oil polymer additive according to any of claims 1 to 4, wherein the living polymer employed is a random or block copolymer of at least one diene selected from among butadiene, isoprene, and dimethylbutadiene and of a vinyl aromatic compound selected from among styrene and α-methylstyrene.

9. A lubricating oil polymer additive according to any of claims 1 to 4, wherein the living polymer employed is a star copolymer obtained from at least one diene selected from among butadiene, isoprene, and dimethylbutadiene, optimally mixed with a vinyl aromatic compound selected among styrene and α-methylstyrene, and from divinylbenzene.

10. A lubricating oil polymer additive according to any of claims 1 to 4, wherein the said living polymers employed are obtained by anionic polymerization in the presence of organometallic catalysts at a temperature of between about minus 80° and plus 150° C.

11. A lubricating oil polymer additive according to claim 1, wherein the said living polymer employed is obtained in the presence of a member selected from n-butyllithium and 1,4-dilithio-1,1,4,4-tetraphenylbutane, at a temperature of between about 0° and 100° C.

12. A lubricating oil polymer additive according to claim 4, wherein the metalation operation is carried out at a temperature of between about minus 80° and plus 150° C., in the presence of a complex consisting of a diamine and an organic compound of an alkali metal.

13. A lubricating oil polymer additive according to claim 12, wherein the metalation operation is carried out at a temperature of between 0° and 80° C., in the presence of a complex formed of N,N,N',N'-tetramethylene ethylene diamine and a butyllithium, with a molar ratio of diamine to butyllithium of between about 0.5 and 1.2.

14. A lubricating oil polymer additive according to claim 13, wherein the butyllithium is s-butyllithium and the molar ratio of diamine to s-butyllithium is between about 0.7 and 1.

15. A lubricating oil polymer additive according to claim 12, wherein the amount of complex employed is such that the ratio of the number of mols of organometallic compound in said complex per mol of polymer is less than about 50.

16. A lubricating oil polymer additive according to claim 15, wherein the ratio of the number of mols of organometallic compound in said complex per mol of polymer is between about 2 and 10.

17. A lubricating oil polymer additive according to claims 4 or 5, wherein the metalation step is followed by a grafting operation by addition of a monomer selected from among C$_4$-C$_6$ conjugated dienes, styrene or their mixture, prior to the functionalization step.

18. A lubricating oil polymer additive according to claim 17, wherein the grafting operation is effected at a temperature of between about minus 80 and plus 150° C.

19. A lubricating oil polymer additive according to claim 18, wherein the grafting operation is carried out at a temperature of between about 0° and 100° C.

20. A lubricating oil polymer additive according to any of claims 1 to 5, wherein in the formula I of the N-substituted lactams, Z represents a member selected from a $C_1$-$C_{10}$ alkyl radical, a $C_2$-$C_4$ alkenyl radical, and a phenyl radical substituted by a $C_1$-$C_5$ alkyl group, and n represents a whole number of from about 3 to 5.

21. A lubricating oil polymer additive according to claim 20, wherein in the formula I, n is equal to 3.

22. A lubricating oil polymer additive according to claim 21, wherein the lactam of the formula I is selected from among N-methylpyrrolidone, N-ethylpyrrolidone, and N-vinylpyrrolidone.

23. A lubricating oil polymer additive according to claim 20, wherein the lactam of the formula I is selected from among N-methylcaprolactam, N-ethylcaprolactam, and N-vinylcaprolactam.

24. A lubricating oil polymer additive according to any of claims 1 to 4, wherein the amount of N-substituted lactam employed is such that the molar ratio of N-substituted lactam to number of functionalizable carbanion sites is at least 1.

25. A lubricating oil polymer additive according to claim 1, wherein the amount of N-substituted lactam employed is such that the molar ratio of N-substituted lactam per number of functionalizable carbanion sites is from about 1 to 3.

26. A lubricating oil polymer additive according to claims 4 or 5, wherein the amount of N-substituted lactam used is such that the molar ratio of N-substituted lactam to number of functionalizable carbanion mols is from about 1 to 2.

27. A lubricating oil polymer additive according to any of claims 1 to 4 wherein the functionalization step is carried out at a temperature of between about 10° and 80° C.

28. A lubricating oil polymer additive according to claim 27, wherein the functionalization step is carried out at a temperature of between about 30° and 60° C.

29. A lubricating oil polymer additive according to any of claims 1 to 4, wherein the hydrogenation step is carried out in the presence of a catalytic system obtained by reaction between a transition metal derivative and an organoreduction compound.

30. A lubricating oil polymer additive according to claim 29, wherein the catalytic system has a base of cobalt octoate and triethylaluminum.

31. A lubricating oil improved by the addition of about 0.1 to 10 percent of its weight of a polymer additive according to any of claims 1 to 4.

32. A lubricating oil according to claim 31, improved by the addition of about 1 to 5 percent of its weight of one of the polymer additives according to any of claims 1 to 4.

* * * * *

UNITED STATES PATENT AND TRADEMARK OFFICE
CERTIFICATE OF CORRECTION

PATENT NO. : 4,222,882

DATED : September 16, 1980

INVENTOR(S) : Daniel Brulet et al.

It is certified that error appears in the above-identified patent and that said Letters Patent are hereby corrected as shown below:

Column 2, line 56, delete "U. S. Pat."

Column 8, line 33, in the first column of TABLE II, delete "dipersive" and replace with -- dispersive --.

Signed and Sealed this

Twenty-fifth Day of November 1980

[SEAL]

Attest:

SIDNEY A. DIAMOND

Attesting Officer

Commissioner of Patents and Trademarks